(12) United States Patent
Nickolaou et al.

(10) Patent No.: US 7,333,024 B2
(45) Date of Patent: Feb. 19, 2008

(54) METHOD, SYSTEM AND STORAGE MEDIUM FOR MANAGING AUTOMATED SYSTEM EVENTS

(75) Inventors: James N. Nickolaou, Clarkston, MI (US); Henry W. Baker, Novi, MI (US)

(73) Assignee: General Motors Corporation, Detroit, MI (US)

( * ) Notice: Subject to any disclaimer, the term of this patent is extended or adjusted under 35 U.S.C. 154(b) by 414 days.

(21) Appl. No.: 10/968,494

(22) Filed: Oct. 19, 2004

(65) Prior Publication Data
US 2006/0085084 A1    Apr. 20, 2006

(51) Int. Cl.
*G08B 21/00* (2006.01)
(52) U.S. Cl. .................. 340/679; 340/506; 340/3.1
(58) Field of Classification Search ............. 340/506, 340/679, 3.1
See application file for complete search history.

(56) References Cited

U.S. PATENT DOCUMENTS 5,400,246 A * 3/1995 Wilson et al. ............... 700/17

OTHER PUBLICATIONS

PDM Technologies Inc. brochure, "PlantWatch Machine Monitoring Systems," © 1998-2001.

\* cited by examiner

*Primary Examiner*—Daryl C Pope

(57) ABSTRACT

Disclosed herein is a method, system and storage medium for managing automated system events. The method includes identifying events that are a defined system event and associating the events identified with one of (a) events that cause an automated system to transition from an automatic cycle mode, the events having a fault type associated therewith; and (b) events that do not cause the automated system to transition from the automatic cycle mode. The method also includes generating a listing of the events identified with regard to the associating the events.

18 Claims, 7 Drawing Sheets

METHOD, SYSTEM AND STORAGE MEDIUM FOR MANAGING AUTOMATED SYSTEM EVENTS

BACKGROUND

Embodiments of the invention relate generally to data collection and analysis, and more particularly, to a method, system, and storage medium for managing automated system events.

The utilization of automated systems is becoming increasingly pervasive in a variety of industries, institutions, government agencies, etc. With current advancements in technology, virtually any type of process can now be automated. One area of automation can be found in the manufacturing industry. For example, manufacturing enterprises are enhancing their operations by installing automated machinery for producing finished goods as well as unfinished goods such as subassemblies.

These enterprises, however, are often faced with significant challenges when it comes to maintaining their automated equipment and minimizing downtime. For example, some of the operational issues that lead to the loss of throughput include machine breakdowns, personnel that are tardy, personnel that work too slow, process rejects that put products into repair lanes, and automated stations working beyond their expected cycle time, to name a few.

The reliability of production equipment is important not only because of the potential for loss of throughput, but also because of the potentially large economic consequences of failing to maintain what is conceivably a large investment. Moreover, the reliability of equipment is also important for ensuring the operational safety of employees.

In any automated system environment, it is important to identify those operational issues that are responsible for causing these losses and to address them in an efficient and timely manner. Accomplishing this is not an easy task. In some cases, the necessary information may simply not be available from the system equipment, e.g., in the case of outdated manufacturing systems. In the case of newer systems, the information may be available; however, due to its sheer volume, it may be difficult to interpret or filter.

BRIEF SUMMARY

In accordance with one aspect of the invention, a method for managing automated system events is disclosed. The method includes identifying events that are a defined system event and associating the events identified with one of (a) events that cause an automated system to transition from an automatic cycle mode, the events having a fault type associated therewith; and (b) events that do not cause the automated system to transition from the automatic cycle mode. The method also includes generating a listing of the events identified with regard to the associating the events.

Also disclosed is a system for managing automated system events. The system includes an automated system and a user system in communication with the automated system via a network. The user system includes a processor. The system also includes a collector component in communication with the automated system and a system event manager application used in conjunction with the collector component. The system event manager application identifies events that are a defined system event and associates the events identified with one of (a) events that cause an automated system to transition from an automatic cycle mode, the events having a fault type associated therewith; and (b) events that do not cause the automated system to transition from the automatic cycle mode. The system event manager generates a listing of the events identified with regard to the associating the events.

Other systems, methods and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Referring now to the drawings, wherein like elements are numbered alike in the several figures.

DETAILED DESCRIPTION OF THE PREFERRED EMBODIMENT

Figure 1:
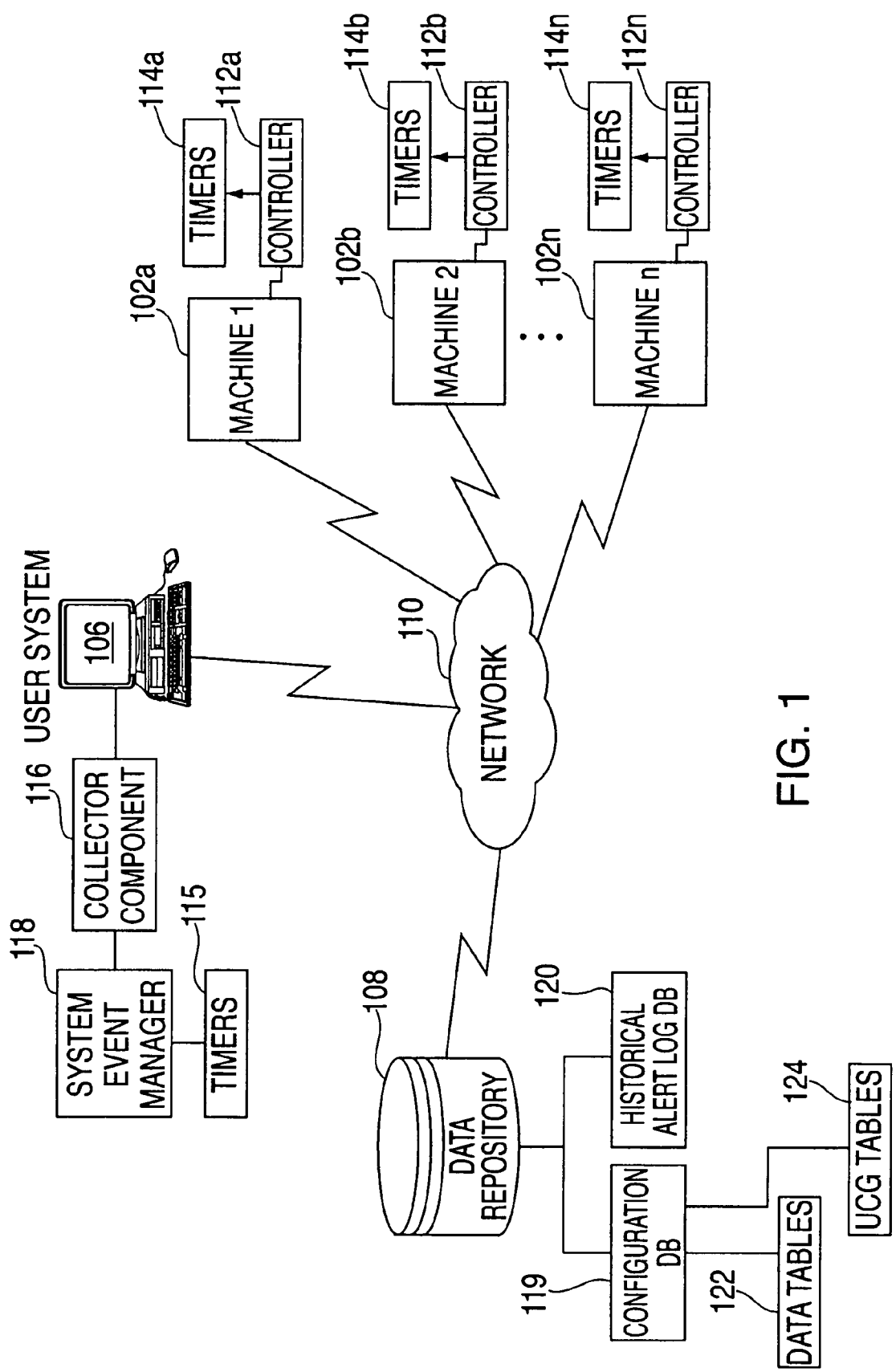
FIG. 1 is a block diagram of a system upon which the system event manager may be implemented in exemplary embodiments.

In accordance with exemplary embodiments, a method, system and storage medium for managing automated system events are presented. A system event manager application captures, saves and timestamps only the message that corresponds to the initial condition which caused a system (e.g., machine, equipment, apparatus, vehicle) to transition out of its automated cycle mode. The system event manager also keeps track not only of the total time spent in the faulted state, it also captures the initial operator response to the fault and automatically separates the total fault time in response time and repair time. Further, the system event manager may be implemented as an add-on to existing collector systems that already contain fault handling logic, or it may be customized to incorporate additional operational alerts by the use of unique condition groupings (UCGs) defined in a configuration database.

Additionally, the system event manager not only captures information about specific errors that cause a system to transition out of automatic cycle mode, it also captures the transition out of automatic cycle mode if no fault condition exists and logs this information as a separate uniquely identifiable condition. Finally, the system event manager is capable of logging the fault time and system response time of those fault events that do not cause the system to transition out of auto cycle mode (e.g., a Level 2.5 fault in a manufacturing environment). Storage requirements are reduced by the system event manager since only the most relevant data is stored.

While the system event manager is described herein with respect to a manufacturing environment, it will be understood by those skilled in the art that the methods described herein may be adaptable to any automated system environment. Accordingly, the following description is provided for illustrative purposes and is not to be construed as limiting in scope.

The following terminology is provided for describing various machine states/conditions relating to production equipment in a manufacturing environment.

Auto cycle running (ACR). Auto cycle running refers to the state of operation in which the station (also referred to herein as a position or machine) is ready to process a part or is currently processing a part in automatic cycle mode.

Blocked. A machine incurs this condition when it is in the automatic cycle mode and capable of processing a part, but it is unable to continue its work because the downstream machinery and/or automation is unable to accept the last part that was processed by the machine. The machine logic may be configured so that once the machine is blocked, the blocked condition remains in effect regardless of whether the machine remains in the automatic cycle mode. The blocked condition may then be removed upon acceptance of the processed part by the downstream machinery/automation.

Starved. A machine is in a starved condition when it is in the automatic cycle mode, is capable of running parts, and is ready to begin work on a new part but is unable to work on the new part because no part is available. The machine logic may be configured so that once the starved condition has been set, the starved condition will remain in effect regardless of whether the machine continues in the automatic cycle mode. The starved condition may be reset when a new part becomes available. If multiple product flow exists, separate starved categories may be maintained, only one of which will be active any time.

Overcycle. A machine is in an overcycle condition when the machine, or individual at a manual station, has taken longer to perform the assigned task than the designed operation time allotted for the machine. The overcycle condition may only exist if the machine is capable of releasing the part (e.g., it is not blocked) and there is a part waiting to enter the machine (e.g., it is not starved).

Empty (Empty Pallet). The time involved in processing a pallet that contains no part or an empty position in the manufacturing system is measured and referred to as Empty time. For example, processing time may be measured for a missing part in the transfer beam of a machine or an empty pallet being transferred through an assembly system.

Reject (Rejected part). The time involved in processing a defective part in the manufacturing system is measured and referred to as Reject time. For example, the total time that a defective part sits at a station until an operator clears it out may be measured or the actual time required to reject a part in a station may be measured.

Line Rate. The line rate refers to the pre-determined slowest machine (manual or automatic) in the manufacturing process. In an assembly system, for example, this may be designed as a manual synchronous area in the system or gross chain speed.

Machine Faults. There may be three or four levels of faults recorded for a given operation: Level 1, Level 2, Level 2.5, and Level 3. The system event manager processes Level 1 and Level 2 faults which may comprise text or numerical strings. A Level 1 fault causes a machine to immediately stop running (e.g., an emergency stop button being pressed by an operator). A Level 2 fault refers to a machine fault occurring during the normal course of manufacturing which causes the machine to stop at the end of a cycle. Action is then taken by a line operator to recover the machine back to an operating state of ACR. A level 2.5 fault refers to a machine fault that occurs during the normal course of the manufacturing cycle and is identified by the system but does not cause the machine to stop at the end of the cycle. No action may be required by the operator for a Level 2.5 fault; however, it is reported and collected as a fault event.

Turning now to FIG. 1, an exemplary system upon which the system event manager may be implemented will now be described. The system shown in FIG. 1 comprises a business enterprise (e.g., a manufacturer) including machines 102a-102n in communication with a user system 106 and data repository 108 over a network 110. User system 106 may be implemented using a general-purpose computer executing a computer program for carrying out the processes described herein. The user system 106 may be a personal computer (e.g., a lap top, a personal digital assistant). User system 106 includes a collector component and logic 116 (also referred to herein as collector component 116) for collecting and processing operational data generated by machines 102a-102n. Collector component 116 may comprise commercial software/hardware for performing the collection and analysis of machine data. In accordance with exemplary embodiments, the system event manager application 118 is incorporated into the logic of collector component 116, however, it will be understood that the system event manager application 118 may include the collection and processing functionality otherwise performed by collector component 116.

In exemplary embodiments, system event manager application 118 also includes timers 115. Timers 115 refer to mechanisms that determine an amount of time elapsing between two discrete events. Used in conjunction with system event manager application 118, these timers 115 measure the total amount of time a machine is in a faulted state, as well as the time a machine incurs conditions such as those described above (e.g., blocked, starved, overcycle, reject, etc.). Further, timers 115 break down the total fault time into response time and repair time. These timers will be described herein as response timers, repair timers, and fault timers for ease of explanation.

Collector component 116 and system event manager application 118 may be implemented by one or more applications executing on user system 106. User system 106 may also execute applications commonly found in a manufacturing environment such as an Enterprise Resource Planning (ERP) software and Manufacturing Execution System (MES) software. Simulation software and post-process predictive analysis tools may also be executed by user system 106 whereby data and information processed by the system event manager application 118 may be made available to these items for further utility.

Machines 102a-102n may comprise production equipment typically found in a manufacturing environment that process parts/materials in accordance with a business plan. Machines 102a-102n each comprise machine controllers 112a-112n, and in alternative embodiments, these controllers 112a-112n include timers 114a-114n. These timers 114a-114n assume the functionality as described above with respect to timers 115.

In alternative embodiments, the collection component and logic 116 may comprise a separate physical device including a processor and memory that are independent of user system 106 and which are in communication with machines 102a-102n via network 110, or the collector component 116 may be resident on one or more of machines 102a-102n and/or machine controllers 112a-112n.

The data repository 108 may be implemented using a variety of devices for storing electronic information. It is understood that the data repository 108 may be implemented using memory contained in the user system 106 or it may be a separate physical device. Data repository 108 is logically addressable as a consolidated data source across a distributed environment that includes network 110. Information stored in data repository 108 may be retrieved and manipulated via the user system 106.

Data repository 108 stores databases including a configuration database 119 and an historical alert log database 120. The configuration database 119 further stores information regarding the machines 102a-102n for which the collector component 116 is responsible, as well as references including data tables 122 and unique condition grouping (UGC) tables 124. Data tables 122 include, e.g., data point definition files, which identify the specific data points that are to be made available to the collector component 116.

The UCG tables 124 store unique condition groupings which refer to unique data points or groups of data points defined for a process or machine. Specialized fault message logging scenarios not already incorporated as part of the machine's control logic may be defined using these UCGs. For example, a UCG may be a single boolean data point that is defined in a data table and is associated with a message string. The data table would define which boolean state or algebraic expression of the data point or data points will trigger the message to be activated. The opposite condition would then "clear" the message. In a complex scenario, for example, a group of data points might be defined, each with a specified dwell time (i.e., the amount of time in-process material is stored between processing steps), and associated with one another along with information indicating the nature of the association (e.g., AND the states or OR the states). Based upon the content of the database, the collector would monitor the states of each point within the group and generate a group-specific message based on the criteria defined in the table.

The historical alert log database 126 stores fault messages and events recorded by the system event manager application 118 and is described further herein.

The network 110 may be any type of known network including, but not limited to, a wide area network (WAN), a local area network (LAN), a global network (e.g., Internet), a virtual private network (VPN), and an intranet. The network 110 may be implemented using a wireless network or any kind of physical network implementation known in the art. In alternate embodiments, the user system 106 may be coupled to a host system of the business enterprise (not shown) through multiple networks (e.g., intranet and Internet). User system 106 may also be connected to the network 110 in a wireless fashion. In one embodiment, the network 110 is an intranet and user system 106 executes a user interface application (e.g., a web browser) to contact the host system through the network 110. In another embodiment, the user system 106 is connected directly (i.e., not through the network 110) to the host system and the host system is connected directly to or contains the storage device 108. In yet a further embodiment, network 110 is a cable that links user system 102 to data repository 108 or that enables user system 106 and data repository 108 to share a common memory.

In a manufacturing system such as that depicted in the system of FIG. 1, the collector component 116 ties into specified points on a production line that include machines 102a-102n. Each of machines 102a-102n contains several bits that signify machine states, faults, or conditions including ACR, Level 1, Level 2, Level 2.5, Overcycle, Reject, Empty, etc., in addition to any UCGs. Further, timers 115 and/or 114a-114n track each of these states, faults, or conditions and provide the information needed by the system event manager application 118. In a normal operating condition, the ACR bit is set to "1" indicating that the machine is capable of manufacturing parts. During processing, the collection logic observes the time of manufacturing for the part. If for any reason this time exceeds the predetermined line rate, an active alert (e.g., overcycle, reject, empty, etc.) message for this machine is created, maintained, available to user system 106, reported as an active condition, and written to the historical alert database 120 when the state is cleared. In the case of a fault alert logging (e.g., Level 1, 2, or 2.5), in addition to monitoring these conditions, a sequence of actions is conducted by the collection component 116 and system event manager application as illustrated generally in FIG. 2.

Figure 2:
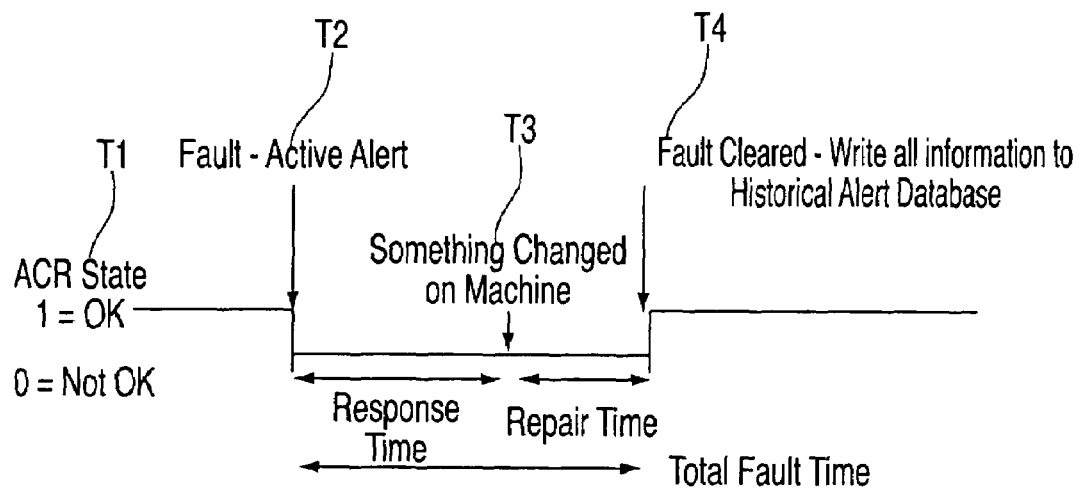
FIG. 2 illustrates a graphical timeline of data collection activities conducted for a manufacturing process in exemplary embodiments.

As shown in the graph of FIG. 2, the timeline begins where the machine state is running in an active ACR mode at T1. A fault occurs for the machine at T2. At T3, a change occurs (e.g., a change in machine state, a change in generated message, or reset button pressed, etc.). At T4, the fault is cleared. The time between T2 and T4 represents the total fault time. A typical collector would then write all of the information collected from T1 through T4 to historical alert log database 120. Clearly, the amount of data collected between T1 and T4 may be voluminous and much of the data may not be useful in understanding the cause of the fault. The system event manager application 118 reduces the amount of data stored in a history log by capturing, saving and timestamping only the message that corresponds to the initial condition that caused the machine to transition out of automatic cycle. Other messages (e.g., those that do not correspond to the initial condition causing the transition) may be displayed by the system event manager application 118 for use in assisting an operator to further assess the event. Additionally, the system event manager not only tracks the total time spent in the faulted state, but also captures the initial operator response to the fault and automatically separates the total fault time into response time and repair time (e.g., T2-T3 and T3-T4).

Additionally, the system event manager application 118 not only captures information about specific errors that caused a machine to transition out of automatic mode, but it also captures the transition out of automatic cycle mode if no fault condition exists and logs this information as a separate uniquely-identifiable condition. The system event manager application 118 may also log the fault time and system response time of those fault events that do not cause the machine to transition out of auto cycle (i.e., Level 2.5 faults).

Figure 3:
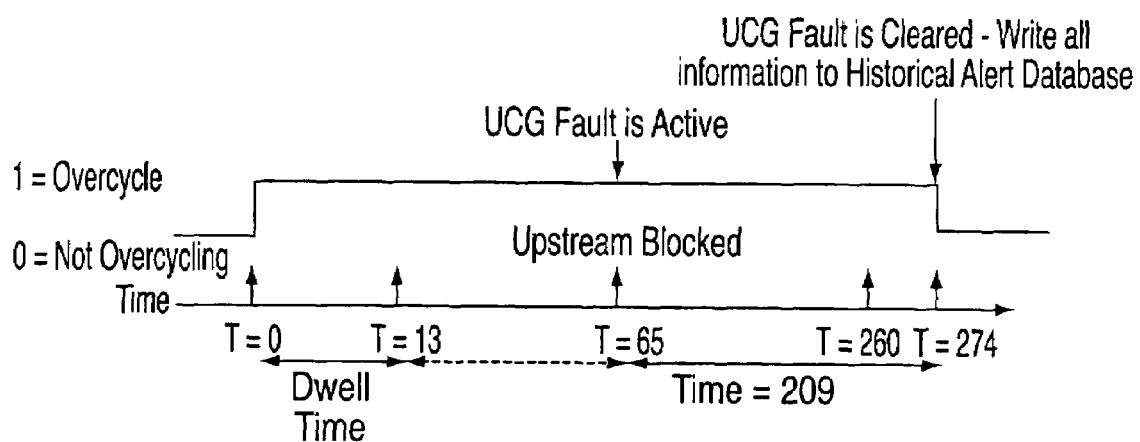
FIG. 3 illustrates a sample graphical timeline of data collection activities, including UCG-defined collection, conducted for a manufacturing process in exemplary embodiments.

In addition to processing Level 1, Level 2, and Level 2.5 fault messages and overcycle, empty pallet, and reject pallet information, the system event manager application may also process custom-defined fault messages that are not incorporated as part of the machine control logic. Turning now to FIG. 3, a sample graphical timeline illustrating the collection and processing of data using custom-defined data collection points, or UCGs, will now be described. It is assumed for purposes of this example, that a machine comprises a standalone manual station in which an operator must press a button to release completed work. It is also assumed that this machine has an 18 second expected cycle time and the line rate is 31 seconds. In a typical manufacturing production line setting, a station operator may walk away from a job when there are no parts at the station. When a single part eventually shows up at T=0 seconds (with no other parts behind it), this single part tends to be processed in an overcycle state because the operator may not return to the line quickly enough. In reality, it may take several parts to be stacked up at this position waiting to be processed before there is a potential of starving upstream stations. Likewise, the operator, depending on the rate of completing this process, has the opportunity to complete and release the product faster than the 18 seconds allotted. Therefore, this position may be able to catch up.

Using this example, a UCG may be defined to look at the machine's overcycle bit (i.e., exceeds 18 seconds) with a dwell time of 13 seconds. The UCG may be defined such that when this station is blocking the downstream bottleneck station OR not starving the upstream bottleneck station, the system event manager application 118 will record the difference from the true state of this UCG logic until the UCG logic is false. Continuing with this example, the upstream line is blocked at T=65 and the operator returns at T=260 seconds (from the time the pallet showed up), completes the process, and presses the release button at T=274 seconds. Once the button is pressed to release the part, the system event manager application 118 will record an historical record of 209 seconds of production loss time. If any subsequent manual cycle exceeds 18 seconds and the downstream station is starved, then another set of UCG criteria could be used to determine if this position caused the starvation.

The following data variables are employed by the system event manager application 118 in capturing, processing, and storing specific production loss data and machine events. These data variables are described further in FIGS. 4A-4C.

Fault_Acknowledged. This variable accepts a True/False entry and is used to differentiate between the response and repair time associated with an event.

Saved_Msg. This variable distinguishes Level 1 and Level 2 fault strings and indicates whether a machine has transitioned out of ACR mode.

Active_Fault_Total. This variable records only those events that relate to the initial condition that caused the event.

Figure 4A:
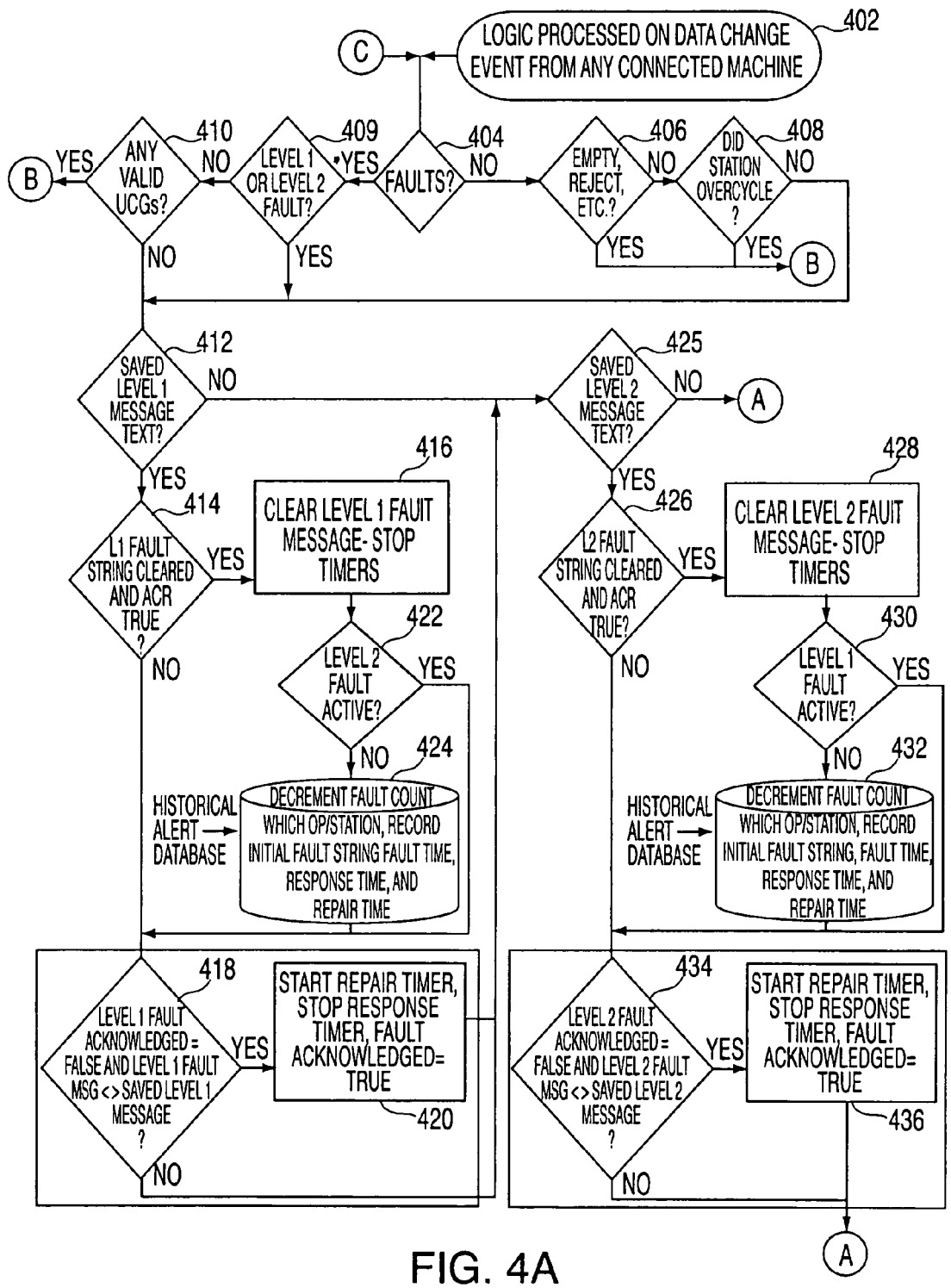
FIGS. 4A-4C represent a flow diagram of a process for implementing the automated system management method in exemplary embodiments.
Figure 4B:
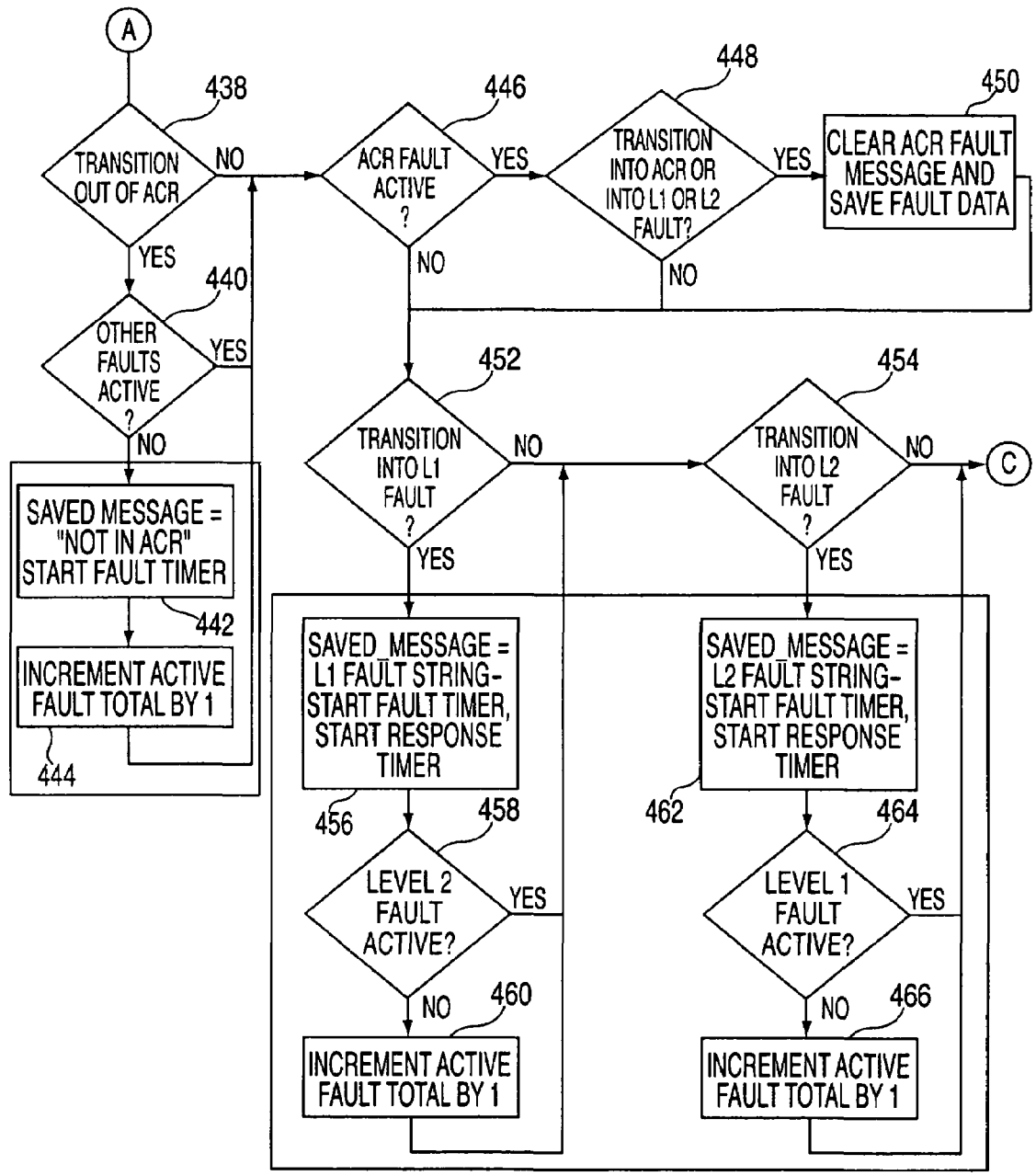
Figure 4C:
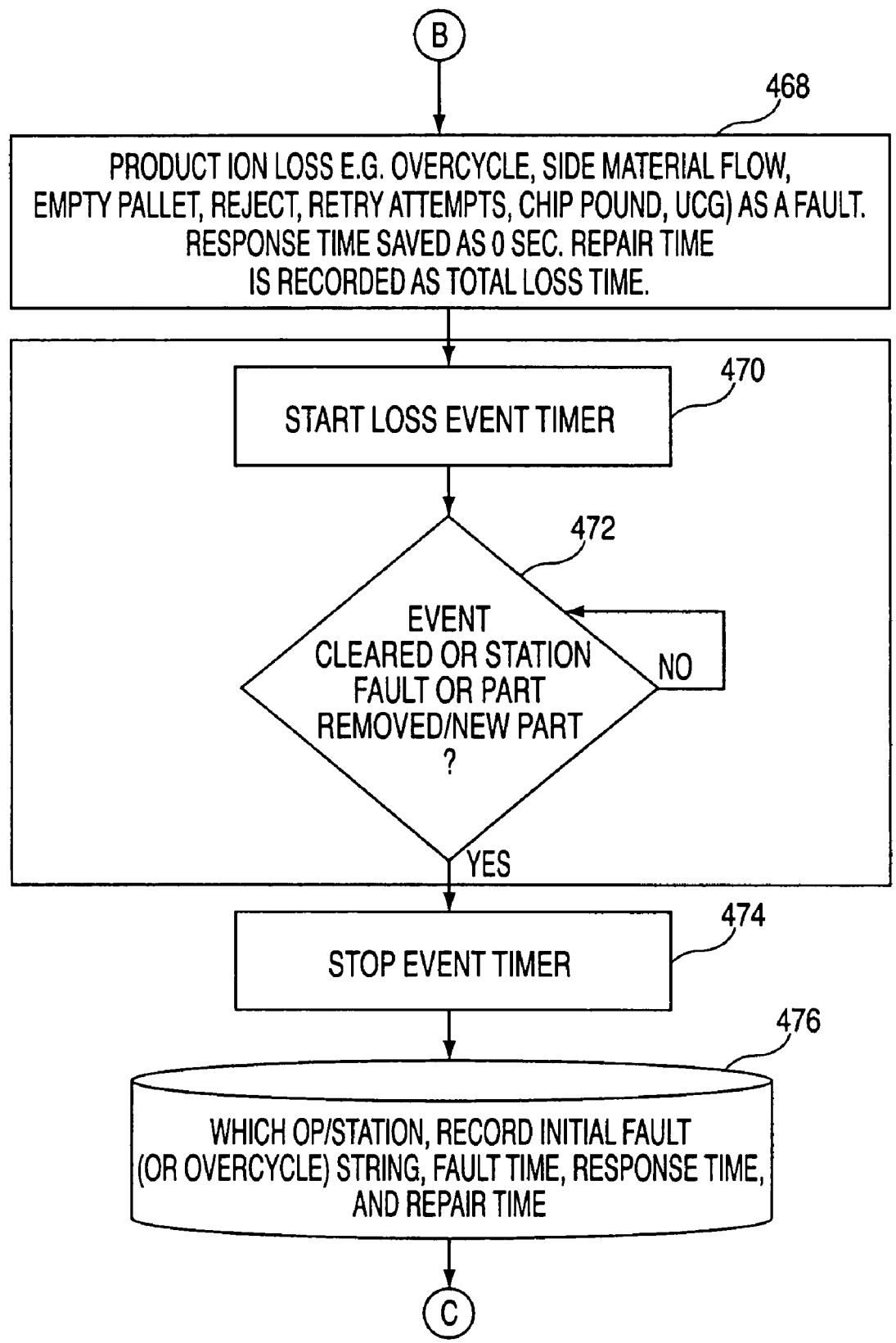

Turning now to FIGS. 4A-4C, a process for implementing the system event manager application 118 will now be described. At step 402, a change in a machine's operating condition (also referred to as event) received from one of machines 102a-102n is processed by collector component 116. At step 404, the machine state is examined to determine if there are any active faults. If there are no active faults, the event is examined to determine whether a machine condition is present at steps 406 and 408. This may be performed by checking the associated bits assigned on the machine as described above. If the machine has not incurred an empty, reject, etc., condition at step 406, the machine is examined to see if it has overcycled at step 408. If not, the process continues at step 412.

Turning back to step 404, if an active fault has been detected, it is then determined whether the fault is either a Level 1 or Level 2 fault at step 409. If the fault is a Level 1 or Level 2 fault, the process continues at step 412. Otherwise, if the fault detected is not a Level 1 or Level 2 fault, it is then determined whether any UCGs are indicated for the machine at step 410. If no UCGs are indicated, the process proceeds to step 412. Otherwise, if any of the conditions of steps 406, 408, and 410 are present, the process proceeds to step 468 of FIG. 4C.

Returning to step 404, if a fault has occurred for the machine or, alternatively, if none of steps 406, 408, and 410 is true (indicating that no condition is present), then it is determined whether a message text for a Level 1 fault has been saved by the collector component 116 at step 412. Steps 412-424 are directed to the processing of messages generated by collector component 116 and filtering out superfluous data. Further, Level 1 messages are distinguished from Level 2 messages during these steps.

If a message text for a Level 1 fault has been saved at step 412, the system event manager application 118 checks to see if the Level 1 fault string for the machine has been cleared and whether the ACR bit is set to "1" at step 414. If so, the system event manager clears the Level 1 fault message and stops the repair, response, and fault timers at step 416. If, on the other hand, the Level 1 fault string has not been cleared and/or the ACR bit is not set to "1" at step 414, it is then determined whether the Level 1 fault has been acknowledged and whether the Level 1 fault message is the same as the saved Level 1 message at step 418. If either of these elements of step 418 is false, the repair timer is initiated, the response timer is stopped, and the fault acknowledgement flag is set to true at step 420. Steps 418-420 are directed to tracking the repair time involved for the event.

Returning to step 416, once the Level 1 fault message has been cleared, it is determined whether a Level 2 fault is active for the machine at step 422. If not, the system event manager decrements the fault count for the machine and records the initial fault string, fault time, response time, and repair time in the historical alert log of data repository 108. Otherwise, the process continues to step 418 as described above.

Returning to step 418, if either element of step 418 is true, the process continues at step 425. Alternatively, if a Level 1 message text has not been saved at step 412, the process continues at step 425. Steps 425-432 are directed to the processing of messages generated by collector component 116 and filtering out superfluous data.

At step 425, it is determined whether a Level 2 message text has been saved. If not, the process proceeds to step 438 of FIG. 4B. Otherwise, it is determined whether the Level 2 fault string has been cleared and whether the ACR bit for the machine is set to "1" at step 426. If so, the Level 2 fault message is cleared and the repair and fault timers are stopped at step 428. It is then determined whether a Level 1 fault is active at step 430. If not, the system event manager decrements the fault count for the machine and records the initial fault string, fault time, response time, and repair time at step 432. Otherwise, the process continues at step 434.

Returning to step 426, if the Level 2 fault string has not been cleared and/or the ACR is not set to "1", it is next determined whether the Level 2 fault has been acknowledged and whether the Level 2 fault message is the same as the saved Level 2 message at step 434. If not, the process continues at step 438 of FIG. 4B. Otherwise, the repair timer is started, the response timer is stopped, and the fault acknowledgement field is set to true at step 436. Steps 434-436 are directed to the repair time involved for the event.

Turning now to FIG. 4B, upon completing step 436 or, alternatively, if a Level 2 message text is not saved at step 425, it is determined whether the machine has transitioned out of ACR mode at step 438. If so, it is then determined whether any other faults are active at step 440. If not, the system event manager enters in Saved_Message variable "Not in ACR" and starts the fault timer at step 442, followed by incrementing the Active Fault Total field by 1 at step 444. Steps 438-444 are directed to distinguishing faults that cause the machine to transition out of ACR mode from those that do not cause the machine to transition out of ACR mode.

Upon incrementing the Active Fault Total field at step 444 or, alternatively, if it is determined that the machine has not transitioned out of ACR mode at step 438, it is then determined whether an ACR Fault is active at step 446. If so, it is next determined whether the machine has transitioned into ACR or into a Level 1 or Level 2 fault at step 448. If so, the system event manager application 118 clears the ACR fault message variable and saves the fault data at step 450.

Upon clearing the ACR fault message at step 450 or alternatively, upon determining that either an ACR fault is active at step 446 or that the machine has transitioned into ACR or Level 1 or Level 2 faults at step 448, it is then determined whether the transition was to a Level 1 fault at step 452. If not, it is determined whether the transition was to a Level 2 fault at step 454. If not, the process continues to step 404 of FIG. 4A.

Returning to step 452, if the transition was to a Level 1 fault, the system event manager enters the Level 1 fault string into the Saved_Message, variable starts the fault timer, and starts the response timer at step 456. Steps 456-460 are directed to distinguishing Level 1 faults from Level 2 faults for those events that do cause the machine to transition out of ACR mode and recording the events as such. It is then determined whether a Level 2 fault is active at step 458. If so, the process continues at step 454. Otherwise, the Active Fault Total count is incremented by 1 at step 460 and the process continues at step 454.

If the transition was to a Level 2 fault at step 454, the system event manager enters the Level 2 fault string into the Saved_Message variable and starts the fault and response timers at step 462. At step 464 it is determined whether a Level 1 fault is active. If so, the process returns to step 404 of FIG. 4A. Otherwise, the Active Fault Total count is incremented by 1 at step 466 and the process returns to step 404 of FIG. 4A. As described above, steps 462-466 are directed to distinguishing Level 1 faults from Level 2 faults for those events that do cause the machine to transition out of ACR mode and recording the events as such.

Proceeding to FIG. 4C, if any steps 406, 408, or 410 is true (see FIG. 4A), indicating that a condition relating to a production loss has occurred, the condition is recorded as a fault at step 468. The loss event timer is started in order to record the amount of production time lost as a result of the condition at step 470. At step 472, the system event manager determines whether the condition has been cleared. Clearing the condition may include removing a defective part (e.g., a reject part condition), releasing an empty pallet from a machine (e.g., empty pallet condition), etc. If the condition has not been cleared at step 472, the system event manager continues to monitor the condition. If the condition has been cleared at step 472, the system event manager stops the loss event timer at step 474 and records the fault or condition information including fault time, response time and repair time in historical alert log database 120 at step 476. The process then returns to step 404 of FIG. 4A.

The information recorded and stored as a result of the processes described in FIGS. 4A-4C may be retrieved via a user interface provided by the system event manager. The information may be searched, organized, and displayed using various criteria specified by a user at user system 106.

Figure 5:
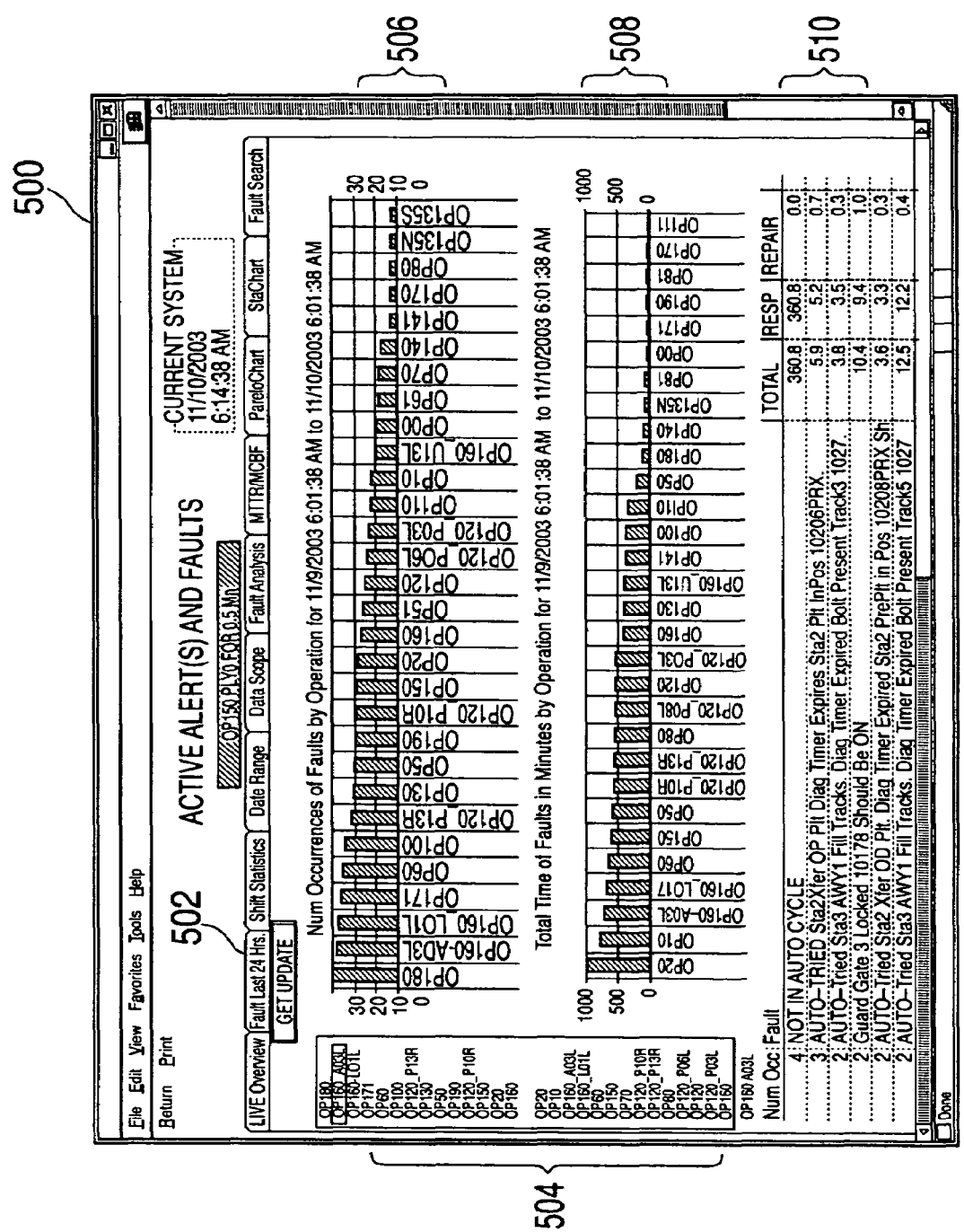
FIG. 5 is a sample user interface screen displaying fault information by number of occurrences and total fault time by operation for a specified time period in exemplary embodiments.
Figure 6:
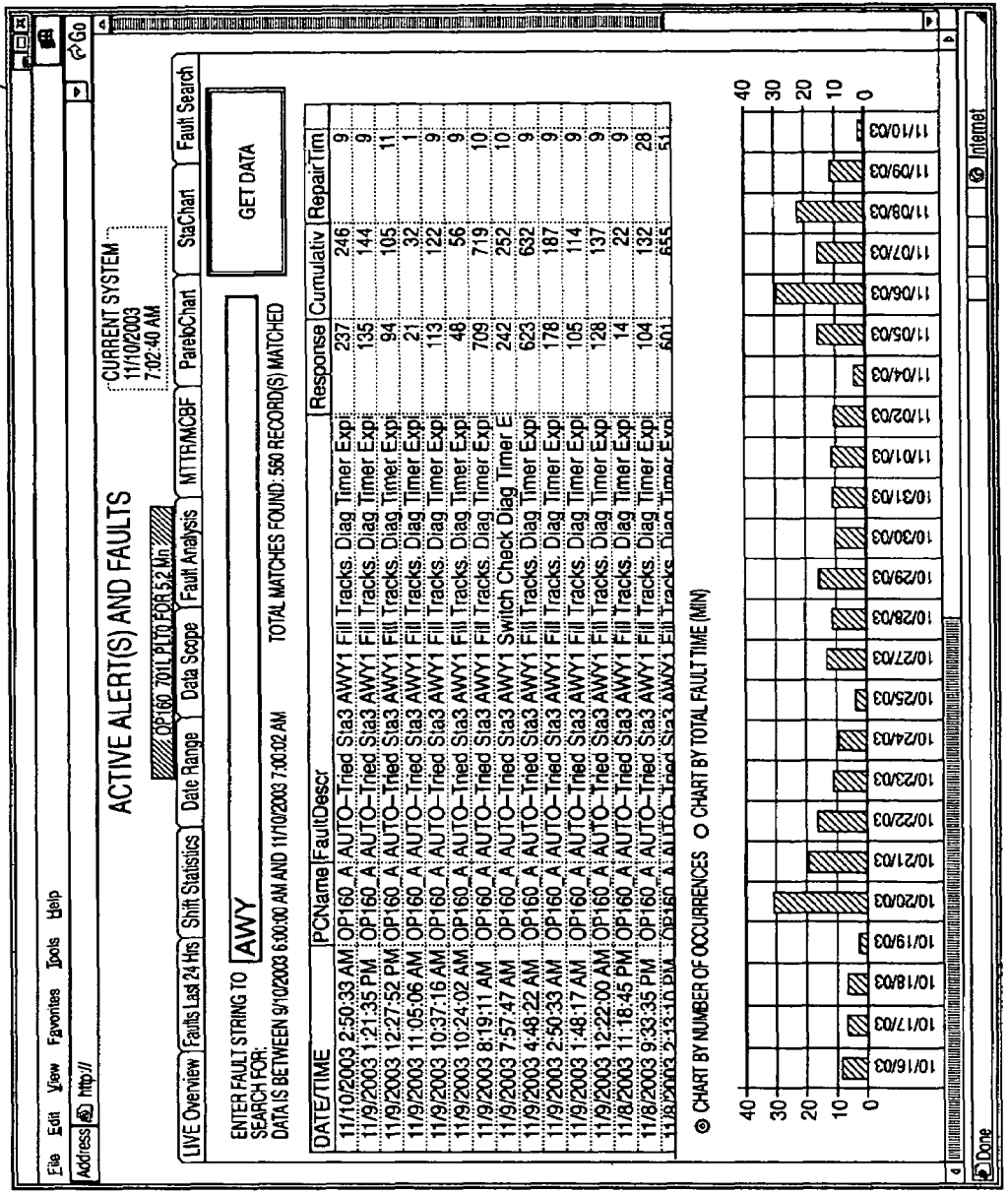
FIG. 6 is a sample user interface screen displaying results of a search conducted for occurrences of a specific fault.

A sampling of the types of data available using the system event manager collection method is shown in FIGS. 5 and 6.

The sample user interface screen 500 of FIG. 5 illustrates fault data for operations conducted on a production line over a specified period of time, in this example, 24 hours. As shown in user interface screen 500, a user has selected tab 502 in order to view fault information occurring over the last twenty-four hours. User interface screen 500 depicts a listing of operations 504 occurring for a production line. User interface screen 500 also illustrates a graphical representation of the number of fault occurrences by machine operation 506 and a graphical representation of the total time of faults in minutes by operation 508. This information is also available in tabular form as shown in table 510.

A variety of other types of information are available via the user interface of system event manager application 118. FIG. 6 depicts a sample user interface screen 600 illustrating results of a search for a specified fault "AWY." By searching for a specific fault, information may be acquired that reveal patterns or trends useful in assessing what, if any, maintenance procedures are required. This information may also provide insight into correlative problems, re-occurring issues, or operational matters that need to be addressed.

The information available from the utilization of the system event manager application 118 may be acquired in real time. The data may be translated into one or more reports that incorporate an ordered list identifying the production losses and/or events associated with a manufacturing system. The data collection and processing methodology of the system event manager application 118 enables real-time and historical throughput loss data from a manufacturing line to be available to individuals responsible for making decisions that affect the manufacturing process and overall operational efficiency of the manufacturing system. The methodology may also be used to prioritize and target manufacturing system improvements on specific machines and sub-systems due to its organized and detailed presentation of data.

As described above, the present invention can be embodied in the form of computer-implemented processes and apparatuses for practicing those processes. The present invention can also be embodied in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an apparatus for practicing the invention. When implemented on a general-purpose microprocessor, the computer program code segments configure the microprocessor to create specific logic circuits. The technical effect of the executable code is to process system events including production loss data from machines in a manner that minimizes the storage of superfluous data by capturing, processing and recording only the initial conditions that cause the events and/or production loss to occur.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to a particular embodiment disclosed as the best mode contemplated for carrying out this invention, but that the invention will include all embodiments falling within the scope of the appended claims.

What is claimed is:

1. A method for managing automated system events, comprising:
   identifying events that are a defined system event;
   associating the events identified with one of (a) events that cause an automated system to transition from an automatic cycle mode, the events having a fault type associated therewith, wherein the fault type indicates a fault with a machine in the automated system running in a current cycle and includes one of:
      a level 1 fault causing the machine in the automated system to stop running before completing the current cycle;
      a level 2 fault causing the machine in the automated system to stop running at the end of the current cycle; and
      a level 2.5 fault indicating that the fault occurred during the current cycle without stopping the machine in the automated system at the end of the current cycle; and
   (b) events that do not cause the automated system to transition from the automatic cycle mode; and
   generating a listing of the events identified with regard to the associating the events.

2. The method of claim 1, wherein the identifying events that are a defined system event is performed in response to detecting a change in the automated system's operating condition.

3. The method of claim 1, further comprising:
   tracking a total duration of the system event.

4. The method of claim 3, wherein tracking a total duration of the system event includes separating the duration into response time and repair time.

5. The method of claim 1, further comprising:
   organizing and storing the listing of the events identified into a searchable database.

6. The method of claim 1, further comprising:
   custom-defining data to be collected from the automated system.

7. The method of claim of claim 6, wherein the custom-defining includes associating an algebraic expression or boolean condition with data points for collection.

8. The method of claim 1, wherein the system event includes at least one of a:
   machine fault;
   blocked state;
   starved state;
   an overcycle;
   a reject part; and
   an empty pallet.

9. A system for managing automated system events, comprising:
   an automated system;
   a user system in communication with the automated system via a network, the user system including a processor;
   a collector component in communication with the automated system;
   a system event manager application executing in conjunction with the collector component; and
   at least one timer in communication with at least one of the automated system and the system event manager application, the system event manager application performing:
   identifying events that are a defined system event;
   associating the events identified with one of (a) events that cause the automated system to transition from an automatic cycle mode, the events having a fault type associated therewith, wherein the fault type indicates a fault with a machine in the automated system running in a current cycle and includes one of:
      a level 1 fault causing the machine in the automated system to stop running before completing the current cycle;
      a level 2 fault causing the machine in the automated system to stop running at the end of the current cycle; and
      a level 2.5 fault indicating that the fault occurred during the current cycle without stopping the machine in the automated system at the end of the current cycle; and
   (b) events that do not cause the automated system to transition from the automatic cycle mode; and
   generating a listing of the events identified with regard to the associating the events.

10. The system of claim 9, wherein the identifying events that are a defined system event is performed in response to detecting a change in the automated system's operating condition.

11. The system of claim 9, wherein the at least one timer tracks a total duration of the system event.

12. The system of claim 11, wherein the at least one timer separates the total duration into response time and repair time.

13. The system of claim 9, further comprising:
   a data repository in communication with the collector component, the system event manager application, and the user system, the data repository including a searchable database storing the listing of events identified.

14. The system of claim 9, further comprising: unique condition groupings of data points that are custom-defined for collection by the collector component.

15. The system of claim of claim 14, wherein the unique condition groupings of data points include an algebraic expression or boolean condition associated with two or more data points.

16. The system of claim 9, wherein the system event includes at least one of a:
   machine fault;
   blocked state;
   starved state;
   an overcycle;
   a reject part; and
   an empty pallet.

17. A storage medium encoded with machine-readable program code for managing automated system events, the program code including instructions for causing a processor to implement a method, comprising:
   identifying events that are a defined system event;
   associating the events identified with one of (a) events that cause an automated system to transition from an automatic cycle mode, the events having a fault type associated therewith, wherein the fault type indicates a fault with a machine in the automated system running in a current cycle and includes one of:

a level 1 fault causing the machine in the automated system to stop running before completing the current cycle;

a level 2 fault causing the machine in the automated system to stop running at the end of the current cycle; and a level 2.5 fault indicating that the fault occurred during the current cycle without stopping the machine in the automated system at the end of the current cycle; and (b) events that do not cause the automated system to transition from the automatic cycle mode; and generating a listing of the events identified with regard to the associating the events.

18. The storage medium of claim 17, wherein the identifying events that are a defined system event is performed in response to detecting a change in the automated system's operating condition.

* * * * *